July 28, 1925.　　　　　　　　　　　　　　　　1,547,192
O. AMOS ET AL
LOADING AND HAULING AUTOMOBILE TRUCK
Filed Aug. 15, 1922　　　　2 Sheets-Sheet 2
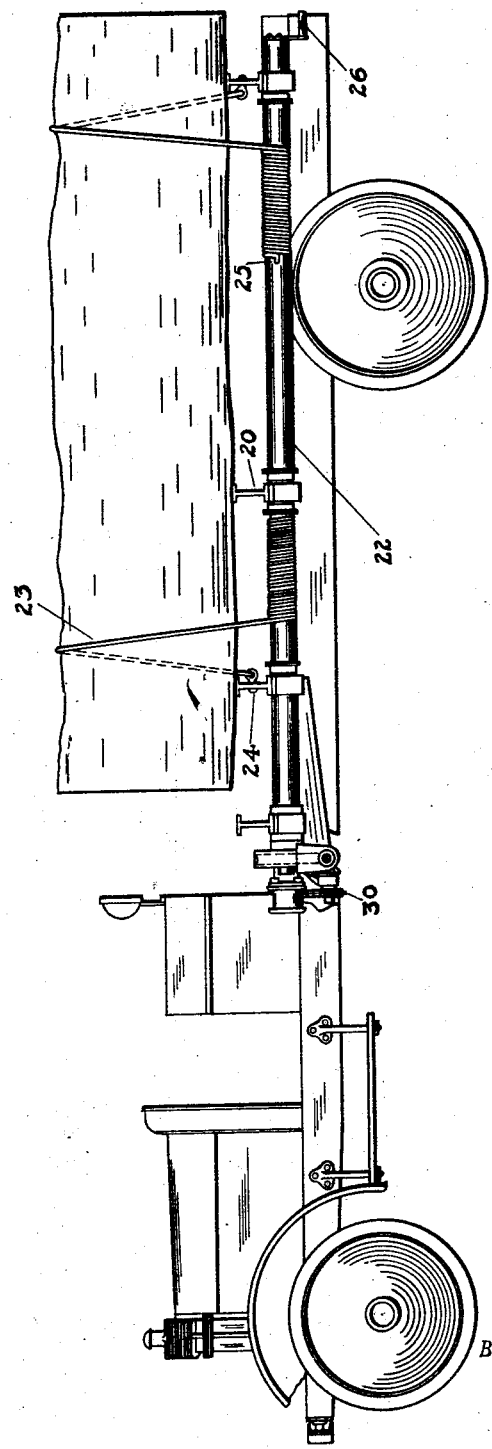
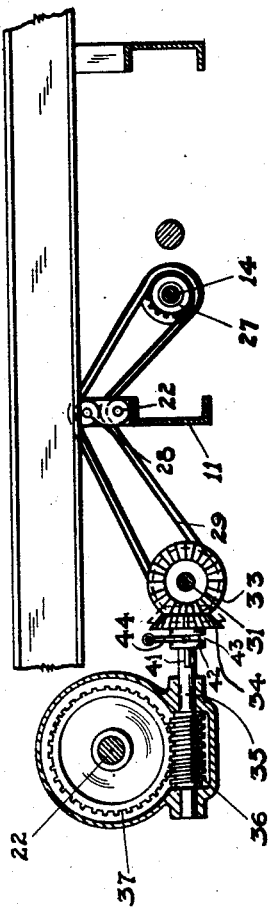
INVENTORS
ORA AMOS
ROY AMOS
EPHRAM A. McKEE.
BY Lockwood & Lockwood
ATTORNEYS Patented July 28, 1925.

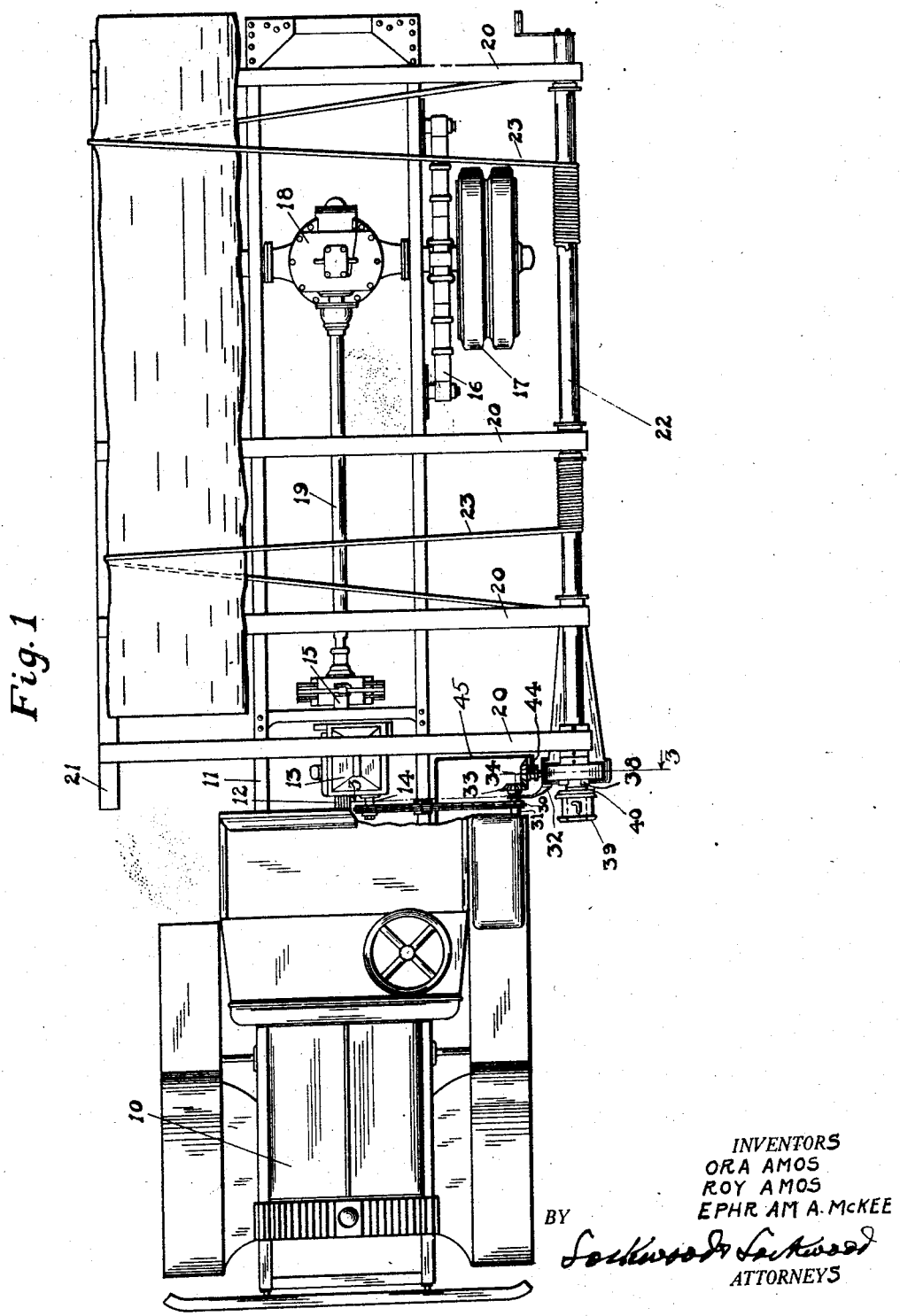

1,547,192

UNITED STATES PATENT OFFICE.

ORA AMOS, ROY AMOS, AND EPHRAM A. McKEE, OF EDINBURG, INDIANA.

LOADING AND HAULING AUTOMOBILE TRUCK.

Application filed August 15, 1922. Serial No. 581,938.

*To all whom it may concern:*

Be it known that we, ORA AMOS, ROY AMOS, and EPHRAM A. McKEE, citizens of the United States, and residents of Edinburg, county of Johnson, and State of Indiana, have invented a certain new and useful Loading and Hauling Automobile Truck; and we do hereby declare that the following is a full, clear, and exact description thereof, reference being had to the accompanying drawings, in which like numerals refer to like parts.

This invention relates to automobile trucks of the character shown in prior Patent No. 1,346,152, dated July 13, 1920, and in particular relates to the power mechanism.

The chief object of this invention is to provide an automobile truck with practical and efficient means for loading logs, pipes and other heavy objects by the power of the engine of the automobile.

The chief feature of the invention consists in the power connection between the engine of the automobile and the windlass shaft of the loading mechanism.

The full nature of the invention will be understood from the accompanying drawings and the following description and claims.

In the drawings, Fig. 1 is a top plan view of an automobile truck provided with a windlass construction and a log supporting framework. Fig. 2 is a side elevational view of the same showing the windlass construction. Fig. 3 is an enlarged sectional view taken on the line 3—3 of Fig. 1 and in the direction of the arrows.

In the drawings 10 indicates generally a motor vehicle chassis having the frame 11. The chassis is also equipped with a clutch controlled shaft 12 which terminates within a gear housing 13. Also positioned within the housing 13 and projecting through the same, as at 14, is a counter-shaft 14. The countershaft 14, it will be understood, is provided with means associated with similar means upon the shaft 12, whereby the shaft 14 will be rotated by the shaft 12. It will be understood that the countershaft 14 carries a plurality of gears and a shaft 15 slidably supports a plurality of gears which are adapted to selectively mesh with the gears upon the shaft 14 in the well known manner. Thus, when the usual gear shift lever or control (not shown) is neutrally positioned, the shaft 15 does not receive power from the shaft 14; yet the shaft 14 will be rotated by the shaft 12 if the clutch, not shown, is in operative position. The frame 11 is supported by the usual spring construction 16, which in turn is supported by the rear wheels 17, in turn driven by a differential construction housed at 18 and driven by a shaft 19 which is associated with the shaft 15 by the usual universal joint construction, and any other suitable means. The particular automobile truck herein illustrated is that known as the "Pierce Arrow" type. To the chassis frame 11, there is secured in substantially parallel relation a plurality of transverse I beams 20. The beams 20 at one end terminate in a longitudinally extending support 21, and at the other end provide bearings for a windlass shaft 22. The windlass shaft 22 is provided with a plurality of cables or chains, one end of each of which is stationarily secured to the framework, or the chassis frame. Herein the chains 23 are shown as secured at 24 to the transverse frame members 20 and the other ends of the chains or cables 23 are secured as at 25 to the windlass shaft 22. Thus rotational movement of the shaft 22 will wind the cable upon said shaft and elevate the log pole or pipe in the well known manner described in the prior patent referred to. The rear end of the windlass shaft 22 is provided with a crank handle 26, whereby the windlass shaft 22 may be manually rotated when desired.

All the foregoing construction is old in the art of transformed trucks and trucks proper. Power is transmitted from the shaft 14 to the shaft 22 by the following mechanism. The shaft 14 is provided with a sprocket gear wheel 27 and suitably supported above the frame 11 is a pair of idler sprocket wheels 28. The sprocket chain 29 passes over both idler sprocket wheels and around the driving sprocket 27 and also the driven sprocket gear wheel 30. The driven sprocket gear wheel 30 is mounted upon a shaft 31 which is suitably supported in the brackets 32. The shaft 31 carries a bevel gear 33 adapted to mesh with another bevel gear 34 upon a shaft 35. The shaft 35 carries a worm 36 which meshes with a worm wheel 37 rotatably mounted upon the windlass shaft 22. The worm wheel 37 is provided with a clutch face 38 and the shaft 22 carries a slidable member 39 having a complementary clutch face 40, for engagement with the face 38. This complementary tooth and socket construction is shown best in Fig. 2. Axial movement of the clutch member 39 into association with the clutch face 38 will cause the windlass shaft 22 to rotate when desired. After the shaft 22 is rotated the desired amount, the clutch member 39 is shifted longitudinally and the power is disconnected from the shaft 22.

In order to permit rotation of the shaft 14 and not have the same actuate the shaft 22 to rotate therewith, an additional clutch construction is provided. A collar 42 has a connection 41 with the shaft 35. The yoke 44 is engageable in the groove 43 of the collar 42 which carries the bevel gear 34. The shifting of rod 45 shifts the bevel gear 34 into and out of mesh with the bevel gear 33. Thus, power is disconnected between the worm shaft and the driving shaft 14. In this manner the worm 36 which meshes with the worm wheel 37 constitutes a lock and prevents rotation of the shaft 22, unless the same is rotated by power or is disassociated from said worm wheel 37 by the actuation of the clutch construction previously described. This last mentioned clutch construction permits the shaft 22 to be reversely rotated by the weight of the logs in the unloading movement, until the chains 23 have become sufficiently loose so as to permit their detachment and thus permit the complete removal of the logs from the truck frame.

The invention claimed is:

1. A loading and hauling automobile truck including the combination with a chassis frame, a loading frame thereon, a motor engine and motor shaft located centrally between the sides of the loading frame, and a loading shaft located parallel therewith at one side of the loading frame of a shaft substantially intermediate said motor and loading shafts, means extending transversely of the loading frame for transmitting power from the engine shaft to said intermediate shaft, a bevel gear on said intermediate shaft, a worm shaft extending transversely of said loading shaft, a bevel gear on said worm shaft meshing with and driven by the bevel gear on said intermediate shaft, a worm wheel which meshes with and is driven by said worm shaft, and clutch means associating said worm wheel and loading shaft.

2. A loading and hauling automobile truck including the construction set forth in claim 1, with an additional means for causing the engagement and dis-engagement when desired of said bevel gears, substantially as set forth.

In witness whereof, we have hereunto affixed our signatures.

ORA AMOS.
ROY AMOS.
EPHRAM A. McKEE.